(12) United States Patent
Kawasaki

(10) Patent No.: US 8,958,940 B2
(45) Date of Patent: Feb. 17, 2015

(54) APPARATUS, METHOD AND PROGRAM FOR VEHICLE MASS ESTIMATION, AND APPARATUS, METHOD AND PROGRAM FOR DETECTING DECREASE IN TIRE AIR PRESSURE

(75) Inventor: Hiroaki Kawasaki, Ashiya (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 551 days.

(21) Appl. No.: 13/241,347

(22) Filed: Sep. 23, 2011

(65) Prior Publication Data

US 2012/0245787 A1 Sep. 27, 2012

(30) Foreign Application Priority Data

Mar. 25, 2011 (JP) ................. 2011-067943

(51) Int. Cl.
  *G06F 7/00* (2006.01)
  *G01G 19/08* (2006.01)
  *B60C 23/06* (2006.01)
(52) U.S. Cl.
  CPC ............ *G01G 19/086* (2013.01); *B60C 23/062* (2013.01)
  USPC ............................................. 701/29.1; 701/1
(58) Field of Classification Search
  USPC ..................................................... 701/1, 29.1
  See application file for complete search history.

(56) References Cited

U.S. PATENT DOCUMENTS

| | | | |
|---|---|---|---|
| 4,876,528 A | 10/1989 | Walker et al. | |
| 5,557,552 A * | 9/1996 | Naito et al. | 702/148 |
| 6,064,931 A | 5/2000 | Sawada et al. | |
| 8,096,174 B2 | 1/2012 | Katou | |
| 2008/0281552 A1 | 11/2008 | Irth et al. | |
| 2011/0288718 A1 * | 11/2011 | Wada | 701/29 |

FOREIGN PATENT DOCUMENTS

| | | |
|---|---|---|
| JP | 63-305011 A | 12/1988 |
| JP | 8-72514 A | 3/1996 |
| JP | 2009-40080 A | 2/2009 |
| JP | 2009-175158 A | 8/2009 |
| JP | 2010-167865 A | 8/2010 |
| JP | 2010-249597 A | 11/2010 |
| WO | WO 99/28172 A1 | 6/1999 |

* cited by examiner

Primary Examiner — John Q Nguyen
Assistant Examiner — Kyung Kim
(74) Attorney, Agent, or Firm — Birch, Stewart, Kolasch & Birch, LLP

(57) ABSTRACT

A vehicle mass estimation apparatus includes a wheel rotation speed information detection device configured to detect rotation speed information regarding the respective wheels of the vehicle; a frequency characteristic estimation device configured to calculate wheel acceleration information based on the rotation speed information of the wheels to estimate a frequency characteristic of the wheel acceleration information; and a vehicle mass estimation device configured to estimate a vehicle mass based on the estimated frequency characteristic. The frequency characteristic estimation device calculates an integrated value of frequency gain magnitudes of the respective frequency domains of front wheels and rear wheels of the vehicle, and the vehicle mass estimation device estimates the vehicle mass based on the ratio among the respective integrated values of the front wheels and rear wheels and a relation calculated in advance between the ratio and the vehicle mass.

20 Claims, 5 Drawing Sheets

APPARATUS, METHOD AND PROGRAM FOR VEHICLE MASS ESTIMATION, AND APPARATUS, METHOD AND PROGRAM FOR DETECTING DECREASE IN TIRE AIR PRESSURE

TECHNICAL FIELD

The present invention relates to an apparatus, a method, and a program for vehicle mass estimation as well as an apparatus, a method and a program for detecting a decrease in tire air pressure.

BACKGROUND ART

A tire having a decreased pressure has a decreased outer diameter (tire effective rolling radius) compared with those of tires having a specified internal pressure (normal air pressure) and thus has an increased wheel speed (rotation angular velocity) compared with those of other normal tires. An apparatus for sensing, based on this principle, a decrease in tire air pressure by the relative comparison among the rotation angular velocities of tires during running has been known as an apparatus for detecting a decrease in tire air pressure based on the dynamic loaded radius (DLR) method (see Patent Literature 1 for example).

In the detection apparatus as described above, determination values DEL1 to DEL3 as shown by the following formula (1) for example are used to determine a decrease in tire air pressure.

$$DEL1 = [\{(F1+F4)/(F2+F3)\}-1] \times 100\ (\%)$$
$$DEL2 = [\{(F1+F2)/(F3+F4)\}-1] \times 100\ (\%)$$
$$DEL3 = [\{(F1+F3)/(F2+F4)\}-1] \times 100\ (\%)$$
(1)

In the formula, F1 to F4 represent the wheel speeds of a left front wheel tire, a right front wheel tire, a left rear wheel tire, and a right rear wheel tire, respectively.

In the DLR-type apparatus for detecting a decrease in tire air pressure, an important technique is to estimate the vehicle mass. The reason is that a tire dynamic loaded radius changes depending on a tire air pressure and also depending on the load applied to a tire. Specifically, in the case of DLR method to sense a decrease in tire air pressure based on a learnt value at a normal internal pressure as a reference, it is impossible to determine, if the vehicle mass during an actual running changes from the one at a normal internal pressure (at learning), whether a change of the determination value DEL is caused due to a load change or is caused due to a decreased pressure, thus failing to correctly sense a decrease in tire air pressure.

To solve this, there have been suggested various techniques to consider (or correct) a decrease in the tire outer diameter due to the load to detect a decrease in tire air pressure. For example, in Patent Literature 2 and Patent Literature 3 according to patent applications by the present applicant, a tire driving stiffness being proportional to (wheel load/internal pressure) is used to estimate the vehicle mass based on the following formula (2). This estimated vehicle mass is used to quantitatively correct a decrease in the dynamic loaded radius due to a load.

$$m(\alpha + g\sin(\theta)) + AV^2 = Fx = T/R$$
(2)

In the formula, m represents a vehicle mass, $\alpha$ represents vehicle acceleration, g represents gravity acceleration, $\theta$ represents a road surface inclination angle, A represents an aerodynamic drag, V represents a vehicle speed, Fx represents a driving force, T represents a vehicle total axle shaft torque, and R represents a tire loaded radius.

The techniques disclosed in Patent Literatures 2 and 3 require not only the speed, acceleration, and axle shaft torque showing vehicle information but also information regarding the inclination angle of the road surface on which the vehicle is running. These pieces of information have a remarkable influence on the accuracy at which the vehicle mass is estimated.

The technique disclosed in Patent Literature 2 uses information obtained from a GPS apparatus. However, a vehicle not including such a GPS apparatus cannot obtain at least information regarding the road surface inclination angle $\theta$, thus failing to estimate the vehicle mass accurately.

To solve this, the technique disclosed in Patent Literature 3 suggests a method by which the vehicle mass can be estimated even without the GPS apparatus. Specifically, based on an assumption that there is a small possibility where the road surface inclination changes at a short time interval, the vehicle mass m is estimated by subjecting data corresponding to a predetermined short time to the iterative least squares technique with regard to the relation of the above formula (2) with presuming mg sin ($\theta$) related to a slope inclination as a constant term.

Furthermore, an abnormal value even during a short time is rejected to thereby minimize the influence by a case where a slope inclination changes. Then, the remaining data group is subjected to the iterative least squares technique with regard to the vehicle acceleration a with presuming Fx−(mg sin($\theta$)+ $AV^2$) as a dependent variable to thereby calculate a corrected vehicle mass.

CITATION LIST

Patent Literature

{PTL1} Japanese Unexamined Patent Publication No. 1988-305011
{PTL2} Japanese Unexamined Patent Publication No. 2009-040080
{PTL3} Japanese Unexamined Patent Publication No. 2010-249597

SUMMARY OF INVENTION

Technical Problem

However, even when an abnormal data value estimated based on the short time data is rejected, it is difficult to completely exclude the influence by the road surface inclination. Thus, it is difficult to exclude an adverse effect according to which the load estimation accuracy declines when the vehicle is running on an up and down road surface for example.

Furthermore, both of the techniques disclosed in Patent Literatures 2 and 3 still have a problem that accurate axle shaft torque information is required and a problem that it is difficult to accurately estimate the vehicle mass when the vehicle acceleration shows a small change as in a constant speed running because the vehicle acceleration a is subjected to the iterative least squares technique.

The present invention has been made in view of the situation as described above. It is an object of the present invention to provide an apparatus, a method, and a program for vehicle mass estimation by which the vehicle mass can be estimated based on wheel rotation speed information without depending on the vehicle running status and without requiring information such as the one on an axle shaft torque as well as an apparatus, a method, and a program for detecting a decrease in tire air pressure using them.

Solution to Problem (1) In accordance with the present invention, there is provided a vehicle mass estimation apparatus for estimating a vehicle mass based on rotation speed information of wheels attached to a vehicle, comprising:

a wheel rotation speed information detection means for detecting rotation speed information regarding the respective wheels of the vehicle;

a frequency characteristic estimation means for calculating wheel acceleration information based on the rotation speed information of the wheels to estimate a frequency characteristic of the wheel acceleration information; and a vehicle mass estimation means for estimating a vehicle mass based on the estimated frequency characteristic, wherein the frequency characteristic estimation means calculates an integrated value of frequency gain magnitudes of the respective frequency domains of front wheels and rear wheels of the vehicle, and the vehicle mass estimation means estimates the vehicle mass based on the ratio among the respective integrated values of the front wheels and rear wheels and a relation calculated in advance between the ratio and the vehicle mass.

In the vehicle mass estimation apparatus of the present invention, a ratio among the frequency characteristics (integrated values of frequency gain magnitudes) of the front wheels and the rear wheels is used to estimate the vehicle mass. Thus, the vehicle mass can be estimated based on a wheel speed signal without requiring information such as the one on an axle shaft torque. Furthermore, the vehicle mass can be estimated without depending on the vehicle running status, thus eliminating the problem of a deteriorated estimation accuracy caused by a fixed acceleration status.

(2) In the vehicle mass estimation apparatus of (1), the frequency characteristic estimation means might estimate the frequency characteristics using any of a fast Fourier transform, a time-series estimation by an autoregressive model, and a time-series data dispersion.

(3) In the vehicle mass estimation apparatus of (1) or (2), the frequency characteristic estimation means preferably calculates an integrated value of frequency gain magnitudes in the respective predetermined and limited bands of the front wheels and rear wheels of the vehicle. In this case, by focusing attention only on a frequency band at which a frequency characteristic changes by a change in a load, influence by other disturbances can be reduced.

(4) In the vehicle mass estimation apparatus of (1) or (2), the frequency characteristic estimation means preferably calculates a difference among pieces of rotation speed information for left and right wheels of the vehicle and calculates the respective pieces of rotation speed information for front wheels and rear wheels of the vehicle. In this case, the calculated difference can be used to remove coordinate phase noise included in the left and right wheels, thus providing improved estimation accuracy.

(5) In the vehicle mass estimation apparatus of (1) or (2), the vehicle mass estimation apparatus preferably further comprises a data rejection means for rejecting rotation speed information in a predetermined acceleration and deceleration running, turning, high-speed running, and low-speed running. During sudden acceleration and deceleration running or sudden turning for example, there is a possibility of a disturbed wheel speed signal. Thus, the data rejection can improve the estimation accuracy. During a high-speed running (e.g., running at 100 km/h or more) or a low-speed running (e.g., running at 40 km/h or less), there is a possibility where a remarkably-changed frequency characteristic makes it difficult to perform an accurate mass estimation. Thus, the data rejection can similarly improve the estimation accuracy.

(6) In accordance with the present invention, there is also provided a vehicle mass estimation method of estimating, based on rotation speed information of wheels attached to a vehicle, the mass of the vehicle, including:

a wheel rotation speed information detection step of detecting rotation speed information regarding the respective wheels of the vehicle;

a frequency characteristic estimation step of calculating wheel acceleration information based on the rotation speed information of the wheels to estimate a frequency characteristic of the wheel acceleration information; and a vehicle mass estimation step of estimating a vehicle mass based on the estimated frequency characteristic, wherein the frequency characteristic estimation step calculates an integrated value of frequency gain magnitudes of the respective frequency domains of front wheels and rear wheels of the vehicle, and the vehicle mass estimation step estimates the vehicle mass based on the ratio among the respective integrated values of the front wheels and rear wheels and a relation calculated in advance between the ratio and the vehicle mass.

In the vehicle mass estimation method of the present invention, a ratio among the frequency characteristics (integrated values of frequency gain magnitudes) of the front wheels and the rear wheels is used to estimate the vehicle mass. Thus, the vehicle mass can be estimated based on a wheel speed signal without requiring information such as the one on an axle shaft torque. Furthermore, the vehicle mass can be estimated without depending on the vehicle running status, thus eliminating the problem of a deteriorated estimation accuracy caused by a fixed acceleration status.

(7) In the vehicle mass estimation method of (6), the frequency characteristic estimation step might estimate the frequency characteristics using any of a fast Fourier transform, a time-series estimation by an autoregressive model, and a time-series data dispersion.

(8) In the vehicle mass estimation method of (6) or (7), the frequency characteristic estimation step preferably calculates an integrated value of frequency gain magnitudes in the respective predetermined and limited bands of the front wheels and rear wheels of the vehicle. In this case, by focusing attention only on a frequency band at which a frequency characteristic changes by a change in a load, influence by other disturbances can be reduced.

(9) In the vehicle mass estimation method of (6) or (7), the frequency characteristic estimation step preferably calculates a difference among pieces of rotation speed information for left and right wheels of the vehicle and calculates the respective pieces of rotation speed information for front wheels and rear wheels of the vehicle. In this case, the calculated difference can be used to remove coordinate phase noise included in the left and right wheels, thus providing improved estimation accuracy.

(10) In the vehicle mass estimation method of (6) or (7), the vehicle mass estimation method preferably further includes a data rejection step of rejecting rotation speed information in a predetermined acceleration and deceleration running, turning, high-speed running, and low-speed running. During sudden acceleration and deceleration running or sudden turning for example, there is a possibility of a disturbed wheel speed signal. Thus, the data rejection can improve the estimation accuracy. During a high-speed running (e.g., running at 100 km/h or more) or a low-speed running (e.g., running at 40 km/h or less), there is a possibility where a remarkably-changed frequency characteristic makes it difficult to perform an accurate mass estimation. Thus, the data rejection can similarly improve the estimation accuracy.

(11) In accordance with the present invention, there is further provided a vehicle mass estimation program for causing, in order to estimate a vehicle mass based on rotation speed information of wheels attached to a vehicle, a computer to function as:

a frequency characteristic estimation means for calculating wheel acceleration information based on rotation speed information obtained by a wheel rotation speed information detection means for detecting rotation speed information regarding the respective wheels of the vehicle to estimate a frequency characteristic of the wheel acceleration information; and a vehicle mass estimation means for estimating a vehicle mass based on the estimated frequency characteristic, wherein the frequency characteristic estimation means calculates an integrated value of frequency gain magnitudes of the respective frequency domains of front wheels and rear wheels of the vehicle, and the vehicle mass estimation means estimates the vehicle mass based on the ratio among the respective integrated values of the front wheels and rear wheels and a relation calculated in advance between the ratio and the vehicle mass.

In the vehicle mass estimation program of the present invention, a ratio among the frequency characteristics (integrated values of frequency gain magnitudes) of the front wheels and the rear wheels is used to estimate the vehicle mass. Thus, the vehicle mass can be estimated based on a wheel speed signal without requiring information such as the one on an axle shaft torque. Furthermore, the vehicle mass can be estimated without depending on the vehicle running status, thus eliminating the problem of a deteriorated estimation accuracy caused by a fixed acceleration status.

(12) In the vehicle mass estimation program of (11), the frequency characteristic estimation means might estimate the frequency characteristics using any of a fast Fourier transform, a time-series estimation by an autoregressive model, and a time-series data dispersion.

(13) In the vehicle mass estimation program of (11) or (12), the frequency characteristic estimation means preferably calculates an integrated value of frequency gain magnitudes in the respective predetermined and limited bands of the front wheels and rear wheels of the vehicle. In this case, by focusing attention only on a frequency band at which a frequency characteristic changes by a change in a load, influence by other disturbances can be reduced.

(14) In the vehicle mass estimation program of (11) or (12), the frequency characteristic estimation means preferably calculates a difference among pieces of rotation speed information for left and right wheels of the vehicle and calculates the respective pieces of rotation speed information for front wheels and rear wheels of the vehicle. In this case, the calculated difference can be used to remove coordinate phase noise included in the left and right wheels, thus providing improved estimation accuracy.

(15) In the vehicle mass estimation program of (11) or (12), the computer is preferably caused to further function as a data rejection means for rejecting rotation speed information in a to predetermined acceleration and deceleration running, turning, high-speed running, and low-speed running. During sudden acceleration and deceleration running or sudden turning for example, there is a possibility of a disturbed wheel speed signal. Thus, the data rejection can improve the estimation accuracy. During a high-speed running (e.g., running at 100 km/h or more) or a low-speed running (e.g., running at 40 km/h or less), there is a possibility where a remarkably-changed frequency characteristic makes it difficult to perform an accurate mass estimation. Thus, the data rejection can similarly improve the estimation accuracy.

(16) In accordance with the present invention, there is yet further provided an apparatus for detecting a decrease in tire air pressure that calculates a tire decreased pressure determination value of a running vehicle to detect a decrease in tire air pressure based on the magnitude of a change of the obtained decreased pressure determination value from a reference value at a normal internal pressure, comprising:

a vehicle mass estimation apparatus of (1) or (2);

a decreased pressure determination value calculation means for calculating the tire decreased pressure determination value based on the wheel speeds of the respective wheels obtained from the wheel speed rotation information detected by the wheel rotation speed information detection means; and a correction means for correcting the tire decreased pressure determination value based on the vehicle mass obtained from the vehicle mass estimation apparatus.

(17) In accordance with the present invention, there is still further provided a method of detecting a decrease in tire air pressure that calculates a tire decreased pressure determination value of a running vehicle to detect a decrease in tire air pressure based on the magnitude of a change of the obtained decreased pressure determination value from a reference value at a normal internal pressure, including:

a vehicle mass estimation method of (6) or (7);

a decreased pressure determination value calculation step of calculating the tire decreased pressure determination value based on the wheel speeds of the respective wheels obtained from the wheel speed rotation information detected in the wheel rotation speed information detection step; and a correction step of correcting the tire decreased pressure determination value based on the vehicle mass obtained by the vehicle mass estimation method.

(18) In accordance with the present invention, there is provided a program for detecting a decrease in tire air pressure that causes a computer, in order to calculate a tire decreased pressure determination value of a running vehicle to detect a decrease in tire air pressure based on the magnitude of a change of the obtained decreased pressure determination value from a reference value at a normal internal pressure, to function as:

a frequency characteristic estimation means for calculating wheel acceleration information based on rotation speed information obtained by a wheel rotation speed information detection means for detecting rotation speed information regarding the respective wheels of the vehicle to estimate a frequency characteristic of the wheel acceleration information;

a vehicle mass estimation means for estimating a vehicle mass based on the estimated frequency characteristic;

a decreased pressure determination value calculation means for calculating the tire decreased pressure determination value based on the wheel speeds of the respective wheels obtained from the wheel speed rotation information detected by the wheel rotation speed information detection means; and a correction means for correcting the tire decreased pressure determination value based on the vehicle mass obtained from the vehicle mass estimation apparatus, wherein the frequency characteristic estimation means calculates an integrated value of frequency gain magnitudes of the respective frequency domains of front wheels and rear wheels of the vehicle, and the vehicle mass estimation means estimates the vehicle mass based on the ratio among the respective integrated values of the front wheels and rear wheels and a relation calculated in advance between the ratio and the vehicle mass.

Advantageous Effects of Invention

An apparatus, a method, and a program for vehicle mass estimation of the present invention can estimate the vehicle mass based on wheel rotation speed information without depending on the vehicle running status and without requiring information such as the one on an axle shaft torque. Furthermore, an apparatus, a method, and a program for detecting a decrease in tire air pressure of the present invention can quantitatively correct a variation of the decreased pressure determination value due to a load, thus improving the accuracy at which a decrease in tire air pressure is detected.

DESCRIPTION OF EMBODIMENTS

The following section will describe in detail, with reference to the attached drawings, an apparatus, a method, and a program for vehicle mass estimation as well as an apparatus, a method, and a program for detecting a decrease in tire air pressure of the present invention.

Figure 1:
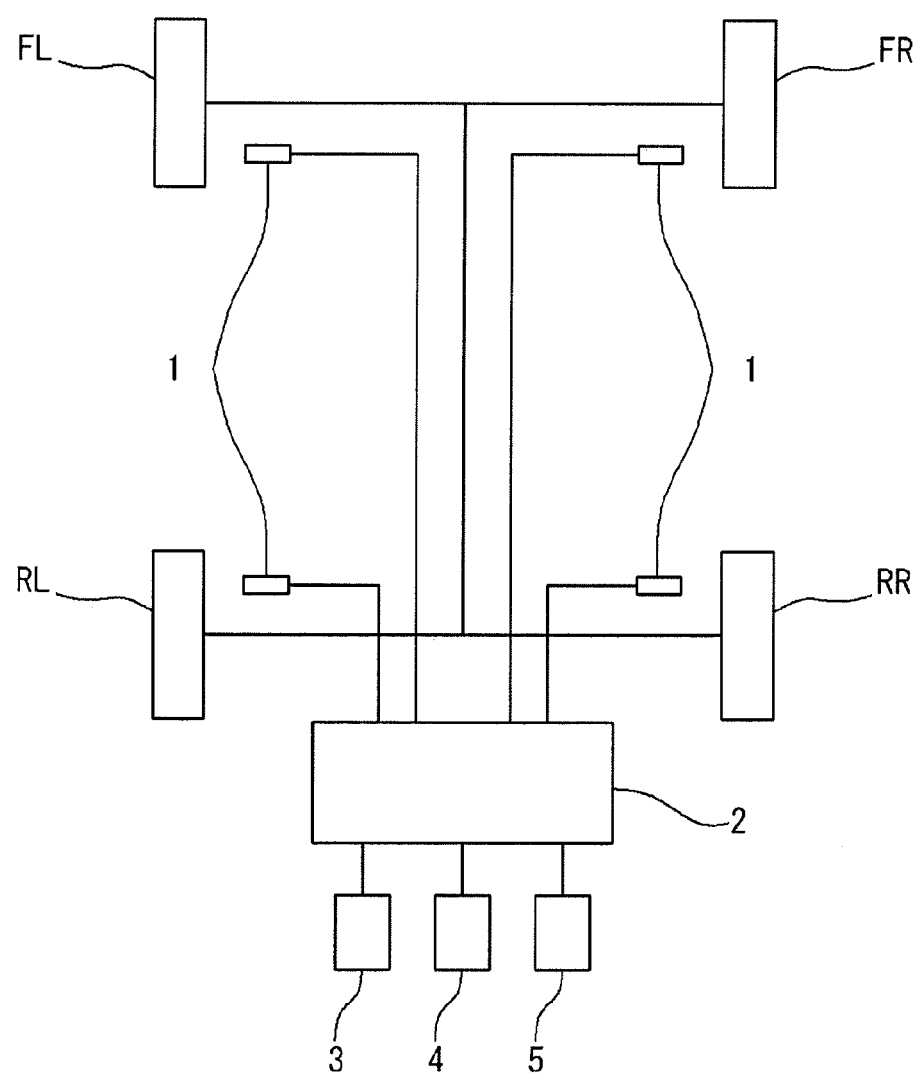
FIG. 1 is a block diagram illustrating one embodiment of an apparatus for detecting a decrease in tire air pressure of the present invention.
Figure 2:
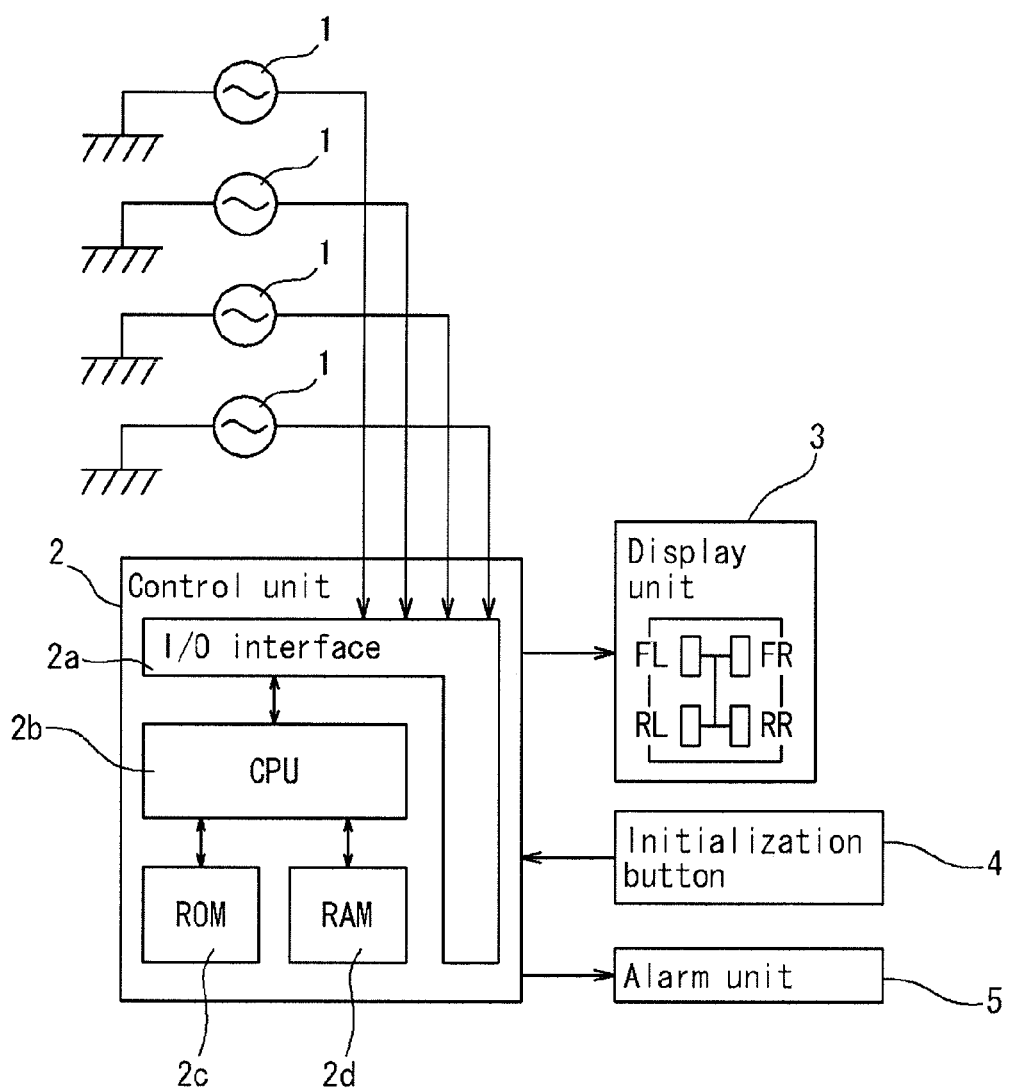
FIG. 2 is a block diagram illustrating the electrical configuration of the apparatus for detecting a decrease in tire air pressure shown in FIG. 1.

FIG. 1 is a block diagram illustrating an apparatus for detecting a decrease in tire air pressure according to one embodiment of the present invention. FIG. 2 is a block diagram illustrating the electrical configuration of the apparatus for detecting a decrease in tire air pressure shown in FIG. 1.

As shown in FIG. 1, an apparatus for detecting a decrease in tire air pressure according to one embodiment of the present invention comprises a normal wheel speed detection means (wheel rotation information detection means) 1 in order to detect the rotation speed information of four tires attached to a four-wheel vehicle of a left front wheel (FL), a right front wheel (FR), a left rear wheel (RL), and a right rear wheel (RR). The normal wheel speed detection means (wheel rotation information detection means) 1 is provided to be associated with the respective tires.

The wheel speed detection means 1 may be, for example, a wheel speed sensor that uses an electromagnetic pickup for example to generate a rotation pulse to measure a rotation angular velocity and a wheel speed based on the number of pulses. The output from the wheel speed detection means 1 is given to a control unit 2 that is a computer such as ABS. Connected to the control unit 2 are a display unit 3 comprising of a liquid crystal display element, a plasma display element or CRT for example for notifying of a tire having a decreased internal pressure; an initialization button 4 that can be operated by a driver; and an alarming unit 5 for notifying a driver of a tire having a decreased internal pressure.

As shown in FIG. 2, the control unit 2 is composed of: an I/O interface 2a required for the exchange of a signal with an external apparatus; a CPU 2b functioning as a computation processing center; a ROM 2c storing therein a control operation program of the CPU 2b; and a RAM 2d into which data is temporarily written or from which the written data is read out when the CPU 2b performs a control operation.

The wheel speed detection means 1 outputs a pulse signal corresponding to the rotation number of a tire (hereinafter also referred to as "wheel speed pulse"). Then, this wheel speed pulse can be resampled based on a predetermined sampling cycle to thereby obtain the time-series data of the wheel speed signal. The sampling cycle must include a frequency characteristic in the vicinity of the tire torsional resonance frequency (generally about 30 to 50 Hz) that changes depending on a load applied to tires. Thus, a desired sampling cycle is 100 Hz or more.

The vehicle mass estimation apparatus according to the present embodiment is mainly composed of: a wheel speed detection means (wheel rotation information detection means) 1; a frequency characteristic estimation means for calculating wheel acceleration information based on the rotation speed information of the wheels to estimate a frequency characteristic of the wheel acceleration information; and a vehicle mass estimation means for estimating a vehicle mass based on the estimated frequency characteristic. The frequency characteristic estimation means calculates an integrated value of frequency gain magnitudes in the respective frequency domains of the front wheels and rear wheels of the vehicle. The vehicle mass estimation means estimates the vehicle mass based on the ratio among the respective integrated values of the front wheels and rear wheels and a relation calculated in advance between the ratio and the vehicle mass.

An apparatus for detecting a decrease in tire air pressure according to the present embodiment is mainly composed of: the vehicle mass estimation apparatus as described above; a decreased pressure determination value calculation means for calculating the tire decreased pressure determination value based on the wheel speeds of the respective wheels obtained from the wheel speed rotation information detected by the wheel rotation speed information detection means; and a correction means for correcting the tire decreased pressure determination value based on the vehicle mass obtained from the vehicle mass estimation apparatus.

A vehicle mass estimation program is installed in the control unit 2 and causes the control unit 2 to function as the frequency characteristic estimation means and the vehicle mass estimation means. A program for detecting a decrease in tire air pressure is also installed in the control unit 2 and causes the control unit 2 to function as the frequency characteristic estimation means, the vehicle mass estimation means, the decreased pressure determination value calculation means, and the correction means.

In the present invention, the vehicle mass is estimated by focusing on that a tire has a different frequency characteristic depending on a load applied to the tire. Among tire frequency characteristics, a frequency characteristic in the vicinity of the tire torsional resonance changes depending on the load. Specifically, tire front and rear forces change depending on the loads applied to the tires, which consequently causes a change in the frequency characteristic in the vicinity of the torsional resonance. Concretely speaking, when an increased load applied to the tires causes tire deflection (i.e., a reduced tire load radius), front and rear forces applied to the tire is increased, thus causing an increased frequency gain in the vicinity of the torsional resonance.

Generally, the frequency characteristic in the vicinity of the tire torsional resonance is influenced not only by the load applied to the tires but also by the road surface or the vehicle running speed. Concretely speaking, the frequency gain when the vehicle is running on a rough road surface is higher than that when the vehicle is running on a smooth road surface. Furthermore, an increased running speed causes the frequency characteristic in the vicinity of the torsional resonance to be broad. In order to solve these problems, the present invention uses the ratio in the frequency characteristic between front wheels and rear wheels. Specifically, the influence by the road surface roughness or the influence by the frequency change due to the running speed appears similarly for both of the front wheels and the rear wheels. Thus, the ratio between the front wheels and the rear wheels is calculated to thereby exclude the above-described influence by the road surface or the running speed.

Next, a method will be described to calculate the vehicle mass based on the evaluation of the frequency characteristics of the front wheels and rear wheels.

Generally, a vehicle axle load change due to a load change is more remarkable for rear wheels. Specifically, a difference in the axle load between when one passenger is in the vehicle and when the maximum load is in the vehicle is very small for the front wheels and is very large for the rear wheels due to the proportionally-increased load. Thus, the method of the present invention that evaluates the ratio in the frequency characteristic value between the front wheels and the rear wheels (rear wheel frequency characteristic value/front wheel frequency characteristic value) can be more correctly recognized as a method of evaluating the ratio in the axle load between the front wheels and the rear wheels rather than a method of estimating the vehicle mass.

Figure 3:
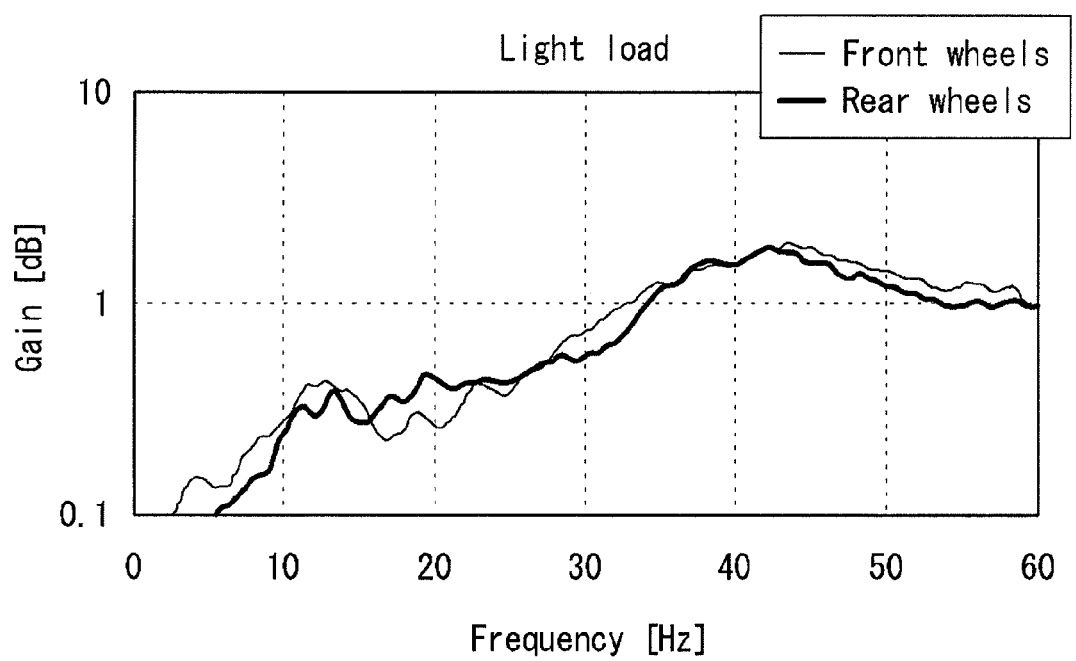
FIG. 3 illustrates an example of the frequency characteristics of the front wheels and the rear wheels when one passenger is in the vehicle (light load)
Figure 4:
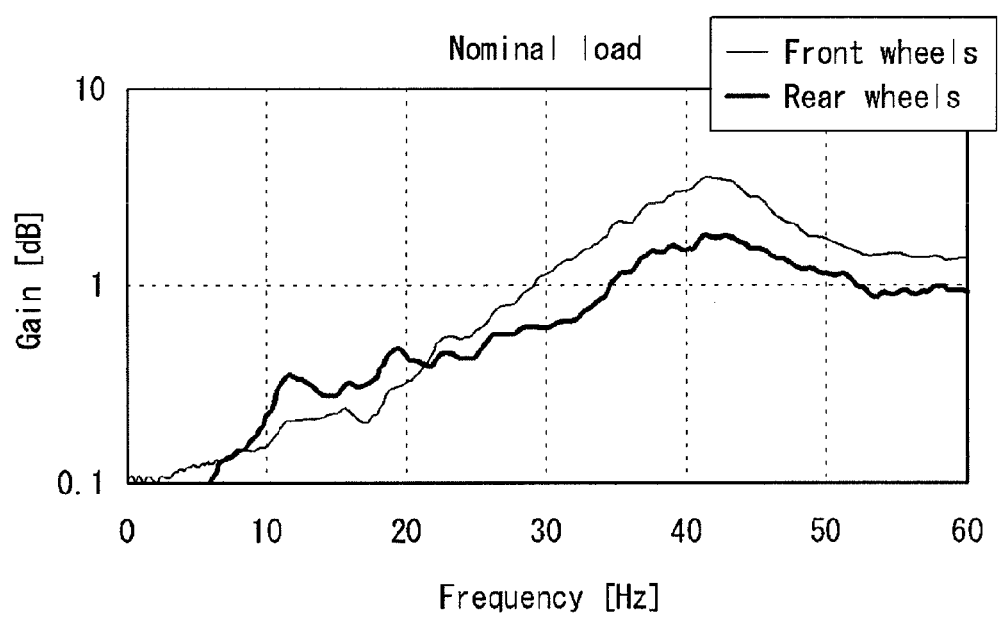
FIG. 4 illustrates an example of the frequency characteristics of the front wheels and the rear wheels at a full load (nominal load)

FIG. 3 and FIG. 4 illustrate an example of the frequency characteristics of the front wheels and the rear wheels when one passenger is in the vehicle (light load) and when a full load (nominal load) is included in the vehicle, respectively. As can be seen from the drawings, when one passenger is in the vehicle, no substantial difference is found in the frequency characteristic between the front wheels and the rear wheels. When the vehicle includes a full load on the other hand, only the rear wheels show a change in the frequency characteristic (increased gain). In the present invention, such a change in the frequency characteristic of the rear wheels is used to estimate the vehicle mass.

Vehicle Mass Estimation

Next, the following section will describe in detail the vehicle mass estimation method according to the present embodiment.

In the present embodiment, a difference in the wheel speed signal between the left and right wheels is calculated. This can consequently remove coordinate phase noise included in the left and right wheels, thus providing improved vehicle mass estimation.

Next, the obtained respective pieces of wheel speed data for the front wheels and the rear wheels are subjected to temporal differentiation to thereby obtain the acceleration data for the respective front and rear wheels.

Next, the frequency characteristic of the wheel speed signal is evaluated. The frequency characteristic can be evaluated based on various methods including, for example, a fast Fourier transform, a time-series estimation by an autoregressive model, and a time-series data dispersion.

When a fast Fourier transform is used for example, the wheel acceleration data for the respective front and rear wheels is subjected to the fast Fourier transform processing. A single fast Fourier transform processing is desirably carried out on such wheel acceleration data corresponding to about 5 to 20 seconds during which no significant change in the running speed is caused.

Next, the sum of the gains of a predetermined band (i.e., an integrated value of the gains) is calculated with regard to the respective front and rear wheels. Although this predetermined band is not particularly limited in the present invention, it may be, for example, the band of 20 to 60 Hz for both of the front wheels and the rear wheels since the predetermined band must include the tire torsional resonance. The sum of the gains of such a band (Gain_F, Gain_R) is calculated. The front wheels and the rear wheels do not have to have the same predetermined band and thus may have different bands to each other.

Next, the ratio between the sum of the gains of the front wheels (Gain_F) and the sum of the gains of the rear wheels (Gain_R) is calculated as a load index LI.

$$LI = (Gain\_F/Gain\_R)$$

Next, load conversion coefficients m1 and m2 calculated in advance are used to convert the value LI to the load (vehicle mass) Load based on the following formula (3).

$$Load = LI \times m1 + m2 \quad (3)$$

In the formula, m1 and m2 can be calculated by, for example, performing a running experiment based on a plurality of different loading statuses (one passenger in the vehicle, one passenger+a cargo of 100 kg, and one passenger+a cargo of 150 kg for example) and by subjecting the obtained value LI and the actual mass corresponding to each of the conditions to the linear regression.

In the present embodiment, in order to improve the estimation accuracy, a process from the fast Fourier transform processing to the load conversion processing is repeatedly carried out a plurality of times (e.g., 100 times) and an average value of the resultant values is used as an estimation vehicle mass.

In the present embodiment, the obtained wheel speed data is rejected depending on the running conditions. During sudden acceleration and deceleration running or sudden turning for example, there is a possibility of a disturbed wheel speed signal. Thus, the corresponding data is desirably rejected in order to improve the estimation accuracy. The data rejection can be performed based on the information from a lateral acceleration sensor or a yaw rate sensor provided in the vehicle, the lateral acceleration calculated based on the wheel rotation speed information, or the front-and-rear acceleration calculated based on the wheel rotation speed information. During a high-speed running (e.g., running at 100 km/h or more) or a low-speed running (e.g., running at 40 km/h or less), there is a possibility where a remarkably-changed frequency characteristic makes it difficult to perform an accurate mass estimation. Thus, data corresponding to the high-speed or low-speed running is desirably rejected.

The frequency characteristic also can be evaluated based on methods other than the fast Fourier transform as described above including, for example, a time-series estimation by an autoregressive model and a time-series data dispersion. When the CPU 2b of the control unit 2 has a sufficient resource, the fast Fourier transform processing is preferred because it can provide an easy evaluation of the frequency characteristic.

When the CPU 2b has a limited resource, however, a time-series estimation by an autoregressive model or a time-series data dispersion may be used.

When the dispersion of wheel speed signals is evaluated, an average value for a predetermined time of the absolute values of the wheel acceleration signals of the respective front and rear wheels can be used as a frequency characteristic value. The actual dispersion is obtained by evaluating the variation of the respective pieces of data from the average value. However, since the wheel acceleration is substantially zero in the present embodiment, the average value of the absolute values of the wheel acceleration can be calculated to thereby obtain substantially the same value as in the one obtained by the evaluation of the dispersion. The term "dispersion" herein means "an average value of the absolute values of the wheel acceleration".

When the dispersion is used as a frequency characteristic value, the dispersion can be calculated after subjecting the wheel acceleration data to a predetermined bandpass filter processing to thereby limit the band to be evaluated as described above.

Test Example

A test was carried out to examine the accuracy of the vehicle mass estimation method of the present invention. All of the four wheels of an FF vehicle were attached with tires (215/60R17) having a reference internal pressure. Then, the vehicle was allowed to run on a general road at a speed of 40 to 100 km/h for about 35 minutes under the following different vehicle load conditions (1) to (5).

Load Conditions
(1) One passenger in the vehicle (1830 kg)
(2) One passenger in the vehicle+105 kg (1935 kg)
(3) One passenger in the vehicle+210 kg (2040 kg)
(4) One passenger in the vehicle+315 kg (2145 kg)
(5) One passenger in the vehicle+435 kg (2265 kg)

The wheel speed signals were resampled for the wheel speed data at every 5 ms. A difference in the wheel speed signal between the left wheels and the right wheels was calculated. Then, the temporal differentiation value of these pieces of data was calculated to thereby calculate the wheel acceleration. Then, the moving average deviation for one second of the absolute values of the wheel acceleration of the respective front and rear wheels was calculated. Then, the ratio (L1) between the moving average deviation for the front wheels and the moving average deviation for the rear wheels was calculated.

Figure 5:
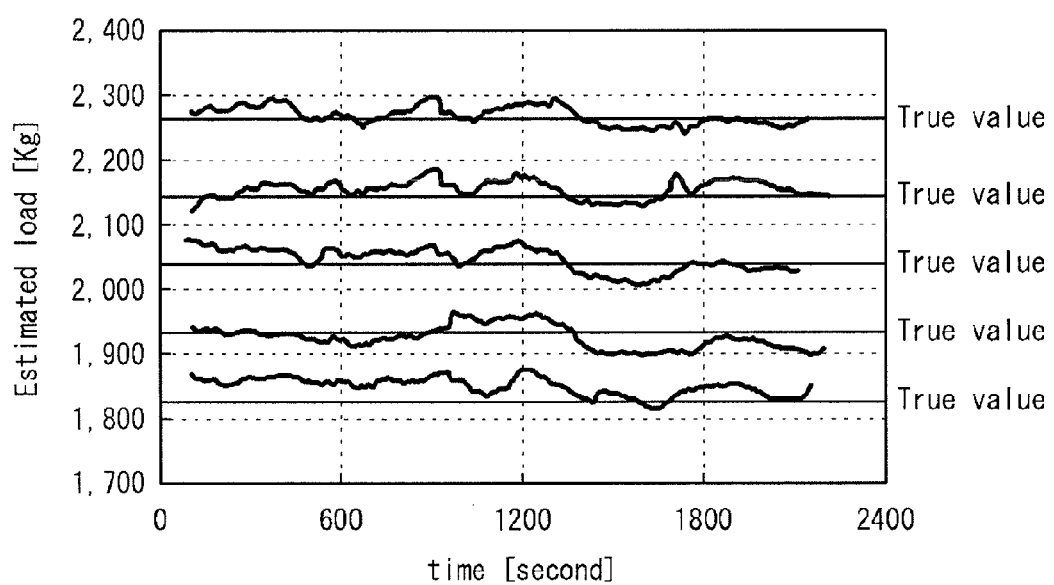
FIG. 5 illustrates the time-series result of the estimated vehicle mass.

Next, the obtained value L1 was converted to a load (Load) based on the above-described formula (3). Then, the obtained load value was further subjected to moving average for data for two minutes. FIG. 5 shows the time-series result of the load estimated in the manner as described above. In FIG. 5, the five true values correspond to the load conditions (1) to (5), respectively, in an order from the smaller one to the larger one. As shown in FIG. 5, under the respective load conditions, the true vehicle mass (true value) can be estimated accurately.

[Detection of a Decrease in Tire Air Pressure]

Next, the following section will describe a method of detecting a decrease in tire air pressure according to the present embodiment.

In the present invention, the DLR method for detecting a change in a dynamic loaded radius is used as an index for detecting a decrease in tire air pressure. The decreased pressure determination value DEL used in this DLR method can be appropriately selected from among the conventionally-known ones. For example, DEL1, DEL2, and DEL3 shown in the formula (1) can be used. In the formula (1), F1 to F4 represent the wheel speeds of the left front wheel tire, the right front wheel tire, the left rear wheel tire, and the right rear wheel tire, respectively.

In the present embodiment, the decreased pressure determination value DEL is corrected based on the vehicle mass estimated by the above-described vehicle mass estimation method. Any of DEL1, DEL2, and DEL3 is influenced by a load. However, since the vehicle trunk frequently includes therein a heavy cargo and DEL2 is particularly influenced by the variation in the load, the following section will describe the correction of DEL2. DEL1 and DEL3 also can be similarly corrected as in DEL2, thus improving the accuracy at which a decreased pressure is detected.

DEL2 is an index showing the comparison between front and rear wheel speeds as shown in the following formula.

$$DEL2 = [\{(F1+F2)/(F3+F4)\} - 1] \times 100 (\%)$$

Generally, a tire having a decreased air pressure has a decreased dynamic loaded radius. Thus, only the tire having a decreased air pressure is rotated at a higher speed than those of the other tires. When a rear wheel has a decreased pressure for example, the rear wheel has an increased wheel rotation speed, thus causing the DEL2 to have a smaller value (negative value). On the other hand, a tire dynamic loaded radius is also decreased when the cargo load is increased. This increased load mainly influences on the rear wheel. Thus, the rear wheel has an increased wheel rotation speed, thereby causing DEL2 to have a smaller value. The change amount of DEL2 caused by a change from one passenger in the vehicle to the full load is similar to the change amount of DEL2 caused by a change of the tire air pressure by about 10 to 30%, though these change amounts of DEL2 vary depending on the tire structure or the full cargo load of the vehicle. Thus, if only the value of DEL2 is used as an index for determining a decreased pressure, it is impossible to determine whether the tire air pressure is decreased or the cargo load is increased.

To solve this, if the relation between the change of the load and the change amount of DEL2 is known in advance and the vehicle mass during running is known, the vehicle mass can be used to correct DEL2 obtained during running. Concretely speaking, DEL2 can be corrected by the following formula for example.

$$DEL2Z = DEL2 - C1 \times DifL$$

In the formula, DEL2 represents DEL2 prior to the load correction, DEL2Z represents DEL2 after the load correction, C1 represents a correction coefficient (e.g., −0.0006), DifL represents a difference between the load learnt based on the reference internal pressure and the current load (during running). The correction coefficient C1 can be calculated in advance for each vehicle by subjecting the vehicle to an experiment running at the reference internal pressure under a plurality of load conditions.

When the change amount between the load-corrected DEL2Z and DEL2 learnt based on the reference internal pressure exceeds a predetermined threshold value, an alarm can be issued by the alarm unit 5 to the driver.

Next, the following section will describe Example of a method of detecting a decrease in tire air pressure of the present invention. However, the present invention is not limited to Example only.

EXAMPLE AND COMPARATIVE EXAMPLE

An experiment running was carried out using the same vehicle, tire, and load estimation conditions as those of the above-described test example. The experiment running was carried out on the round course (asphalt road) of the Okayama test course of Sumitomo Rubber Industries, Ltd. at a speed of 40 to 100 km/h for 30 minutes.

Example 1

Under the conditions of one passenger in the vehicle and the four-wheel reference internal pressure, the value DEL2 was learnt and the average estimation load value was learnt. Thereafter, the vehicle was allowed to run at the full cargo (one passenger+435 kg) and at the reference internal pressure. The result was that the change amount of the DEL2Z (DEL2 after load correction) was 0.345−0.34=0.005 that was lower than the alarm threshold value (0.2), thus an alarm was not issued. Specifically, no false alarm was issued.

Comparative Example 1

Under the conditions of one passenger in the vehicle and the four-wheel reference internal pressure, the value DEL2 was learnt. Thereafter, the vehicle was allowed to run at the full cargo and at the reference internal pressure. The result was that the change amount of DEL2 was 0.08−0.34=−0.26 that exceeded the alarm threshold value (−0.2), thus issuing an alarm. Specifically, a false alarm was issued.

Example 2

Under the conditions of the full cargo and the four-wheel reference internal pressure, the value DEL2 and the average estimation load value were learnt. Thereafter, the vehicle was allowed to run while including one passenger in the vehicle and the two rear wheels having a 25%-decreased pressure. The result was that the change amount of DEL2 was −0.223−0.08=−0.303 that exceeded the alarm threshold value (−0.2), thus issuing an alarm. A decreased pressure could be detected accurately.

Comparative Example 2

Under the conditions of the full cargo and the four-wheel reference internal pressure, the value DEL2 was learnt. Thereafter, the vehicle was allowed to run while including one passenger in the vehicle and the two rear wheels having a 25%-decreased pressure. The result was that the change amount of DEL2 was 0.03−0.08=−0.05 that did not exceed the alarm threshold value (−0.2), thus the decreased pressure could not be detected.

The results of Example 1 and Comparative Example 1 are shown in Table 1. The results of Example 2 and Comparative Example 2 are shown in Table 2. In Examples and Comparative Examples, the load correction coefficient C1 for the DEL2 was −0.0006.

TABLE 1

| Load conditions | Internal pressure | DEL2 | Estimated load value | DEL2Z | Difference from the learnt value |
|---|---|---|---|---|---|
| One passenger in the vehicle (learnt) | Reference internal pressure | 0.34 | 1853 kg | — | — |
| Full load | Reference internal pressure | 0.08 | 2295 kg | 0.345 | 0.005 |

TABLE 1-continued

| Load conditions | Internal pressure | DEL2 | Estimated load value | DEL2Z | Difference from the learnt value |
|---|---|---|---|---|---|

TABLE 2

| Load conditions | Internal pressure | DEL2 | Estimated load value | DEL2Z | Difference from the learnt value |
|---|---|---|---|---|---|
| Full load (learnt) | Reference internal pressure | 0.08 | 2290 kg | — | — |
| One passenger in the vehicle | Rear wheels having a 25%-decreased pressure | 0.03 | 1869 kg | −0.223 | −0.303 |

Other Modification Examples

The present invention is not limited to the above-described embodiment and can be subjected to various changes within the scope of claims. For example, in the above-described embodiment, the estimated vehicle mass was used to correct the decreased pressure determination value DEL2. In addition to the correction of the decreased pressure determination value, the alarm threshold value also can be corrected based on the estimation mass for example. In this case, the alarm threshold value varies depending on the estimation mass.

REFERENCE SIGNS LIST

1 Wheel speed detection means
2 Control unit
2a Interface
2b CPU
2c ROM
2d RAM
3 Display unit
4 Initialization button
5 Alarm unit

What is claimed is:

1. A vehicle mass estimation apparatus for estimating a vehicle mass based on rotation speed information of wheels attached to a vehicle, comprising:
  a wheel rotation speed information detection unit configured to detect rotation speed information regarding the respective wheels of the vehicle;
  a frequency characteristic estimation unit configured to calculate wheel acceleration information based on the rotation speed information of the wheels to estimate a frequency characteristic of the wheel acceleration information; and
  a vehicle mass estimation unit configured to estimate a vehicle mass based on the estimated frequency characteristic,
  wherein the frequency characteristic estimation unit calculates an integrated value of frequency gain magnitudes of the respective frequency domains of front wheels and rear wheels of the vehicle, and the vehicle mass estimation unit estimates the vehicle mass based on the ratio among the respective integrated values of the front wheels and rear wheels and a relation calculated in advance between the ratio and the vehicle mass.

2. The vehicle mass estimation apparatus according to claim 1, wherein the frequency characteristic estimation unit is configured to estimate the frequency characteristics using any of a fast Fourier transform, a time-series estimation by an autoregressive model, and a time-series data dispersion.

3. The vehicle mass estimation apparatus according to claim 2, wherein the frequency characteristic estimation unit is configured to calculate an integrated value of frequency gain magnitudes in the respective predetermined and limited bands of the front wheels and rear wheels of the vehicle.

4. The vehicle mass estimation apparatus according to claim 2, wherein the frequency characteristic estimation unit is configured to calculate a difference among pieces of rotation speed information for left and right wheels of the vehicle and calculates the respective pieces of rotation speed information for front wheels and rear wheels of the vehicle.

5. The vehicle mass estimation apparatus according to claim 1, wherein the frequency characteristic estimation unit is configured to calculate an integrated value of frequency gain magnitudes in the respective predetermined and limited bands of the front wheels and rear wheels of the vehicle.

6. The vehicle mass estimation apparatus according to claim 1, wherein the frequency characteristic estimation unit is configured to calculate a difference among pieces of rotation speed information for left and right wheels of the vehicle and calculates the respective pieces of rotation speed information for front wheels and rear wheels of the vehicle.

7. The vehicle mass estimation apparatus according to claim 1, further comprising a data rejection unit is configured to reject rotation speed information in a predetermined acceleration and deceleration running, turning, high-speed running, and low-speed running.

8. A vehicle mass estimation method of estimating, based on rotation speed information of wheels attached to a vehicle, the mass of the vehicle, including:
a wheel rotation speed information detection step of detecting rotation speed information regarding the respective wheels of the vehicle;
a frequency characteristic estimation step of calculating wheel acceleration information based on the rotation speed information of the wheels to estimate a frequency characteristic of the wheel acceleration information; and
a vehicle mass estimation step of estimating a vehicle mass based on the estimated frequency characteristic,
wherein the frequency characteristic estimation step calculates an integrated value of frequency gain magnitudes of the respective frequency domains of front wheels and rear wheels of the vehicle, and the vehicle mass estimation step estimates the vehicle mass based on the ratio among the respective integrated values of the front wheels and rear wheels and a relation calculated in advance between the ratio and the vehicle mass.

9. The vehicle mass estimation method according to claim 8, wherein the frequency characteristic estimation step estimates the frequency characteristics using any of a fast Fourier transform, a time-series estimation by an autoregressive model, and a time-series data dispersion.

10. The vehicle mass estimation method according to claim 8, wherein the frequency characteristic estimation step calculates an integrated value of frequency gain magnitudes in the respective predetermined and limited bands of the front wheels and rear wheels of the vehicle.

11. The vehicle mass estimation method according to claim 8, wherein the frequency characteristic estimation step calculates a difference among pieces of rotation speed information for left and right wheels of the vehicle and calculates the respective pieces of rotation speed information for front wheels and rear wheels of the vehicle.

12. The vehicle mass estimation method according to claim 8, further including a data rejection step of rejecting rotation speed information in a predetermined acceleration and deceleration running, turning, high-speed running, and low-speed running.

13. A vehicle mass estimation computer program product embodied on a non-transitory computer readable medium for causing, in order to estimate a vehicle mass based on rotation speed information of wheels attached to a vehicle, a computer to function as:
a frequency characteristic estimation module configured to calculate wheel acceleration information based on rotation speed information obtained by a wheel rotation speed information detection module configured to detect rotation speed information regarding the respective wheels of the vehicle to estimate a frequency characteristic of the wheel acceleration information; and
a vehicle mass estimation module configured to estimate a vehicle mass based on the estimated frequency characteristic,
wherein the frequency characteristic estimation module calculates an integrated value of frequency gain magnitudes of the respective frequency domains of front wheels and rear wheels of the vehicle, and the vehicle mass estimation module estimates the vehicle mass based on the ratio among the respective integrated values of the front wheels and rear wheels and a relation calculated in advance between the ratio and the vehicle mass.

14. The vehicle mass estimation computer program product according to claim 13, wherein the frequency characteristic estimation module is configured to estimate the frequency characteristics using any of a fast Fourier transform, a time-series estimation by an autoregressive model, and a time-series data dispersion.

15. The vehicle mass estimation computer program product according to claim 13, wherein the frequency characteristic estimation module is configured to calculate an integrated value of frequency gain magnitudes in the respective predetermined and limited bands of the front wheels and rear wheels of the vehicle.

16. The vehicle mass estimation computer program product according to claim 13, wherein the frequency characteristic estimation module is configured to calculate a difference among pieces of rotation speed information for left and right wheels of the vehicle and calculates the respective pieces of rotation speed information for front wheels and rear wheels of the vehicle.

17. The vehicle mass estimation computer program product according to claim 13, wherein the computer is caused to further function as a data rejection module configured to reject rotation speed information in a to predetermined acceleration and deceleration running, turning, high-speed running, and low-speed running.

18. An apparatus for detecting a decrease in tire air pressure that calculates a tire decreased pressure determination value of a running vehicle to detect a decrease in tire air pressure based on the magnitude of a change of the obtained decreased pressure determination value from a reference value at a normal internal pressure, comprising:
a vehicle mass estimation apparatus according to claim 1;
a decreased pressure determination value calculation unit configured to calculate the tire decreased pressure determination value based on the wheel speeds of the respective wheels obtained from the wheel speed rotation information detected by the wheel rotation speed information detection unit; and a correction unit configured to correct the tire decreased pressure determination value based on the vehicle mass obtained from the vehicle mass estimation apparatus.

19. A method of detecting a decrease in tire air pressure that calculates a tire decreased pressure determination value of a running vehicle to detect a decrease in tire air pressure based on the magnitude of a change of the obtained decreased pressure determination value from a reference value at a normal internal pressure, including:

a vehicle mass estimation method according to claim 8;

a decreased pressure determination value calculation step of calculating the tire decreased pressure determination value based on the wheel speeds of the respective wheels obtained from the wheel speed rotation information detected in the wheel rotation speed information detection step; and a correction step of correcting the tire decreased pressure determination value based on the vehicle mass obtained by the vehicle mass estimation method.

20. A computer program product embodied on a non-transitory computer readable medium for detecting a decrease in tire air pressure that causes a computer, in order to calculate a tire decreased pressure determination value of a running vehicle to detect a decrease tire in air pressure based on the magnitude of a change of the obtained decreased pressure determination value from a reference value at a normal internal pressure, to function as:

a frequency characteristic estimation module configured to calculate wheel acceleration information based on rotation speed information obtained by a wheel rotation speed information detection module configured to detect rotation speed information regarding the respective wheels of the vehicle to estimate a frequency characteristic of the wheel acceleration information;

a vehicle mass estimation module configured to estimate a vehicle mass based on the estimated frequency characteristic;

a decreased pressure determination value calculation module configured to calculate the tire decreased pressure determination value based on the wheel speeds of the respective wheels obtained from the wheel speed rotation information detected by the wheel rotation speed information detection module; and a correction module configured to correct the tire decreased pressure determination value based on the vehicle mass obtained from the vehicle mass estimation apparatus, wherein the frequency characteristic estimation module calculates an integrated value of frequency gain magnitudes of the respective frequency domains of front wheels and rear wheels of the vehicle, and the vehicle mass estimation module estimates the vehicle mass based on the ratio among the respective integrated values of the front wheels and rear wheels and a relation calculated in advance between the ratio and the vehicle mass.

* * * * *